May 24, 1955     K. GROSSKOPF     2,709,127
PROCESS FOR THE DETECTION OF DIETHYLTHIONOPHOSPHORIC
ACID ESTER OF β-OXETHYLTHIOETHYL ETHER
Filed Jan. 15, 1954
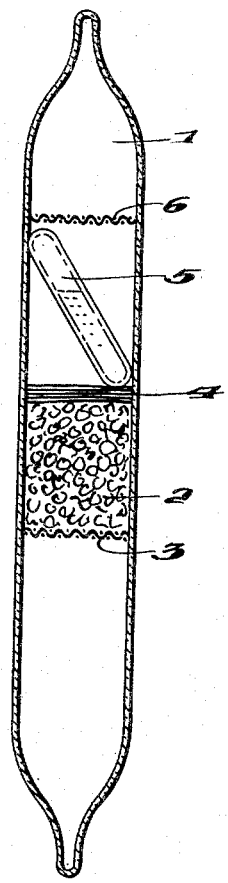
INVENTOR:
KARL GROSSKOPF,
BY Bailey, Stephens & Huettig
ATTORNEYS

"2,709,127"

PROCESS FOR THE DETECTION OF DIETHYL-THIONOPHOSPHORIC ACID ESTER OF β-OX-ETHYLTHIOETHYL ETHER

Karl Grosskopf, Lubeck, Germany, assignor to Otto Heinrich Drager, Lubeck, Germany Application January 15, 1954, Serial No. 404,355

6 Claims. (Cl. 23—230)

The present invention relates to a process for the detection of diethylthionophosphoric acid ester of β-oxethylthioethyl ether, which in the following will be designated as DEO-substance. The structural formula of the DEO-substance is as follows:

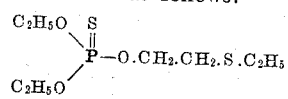

In the process according to the invention, the objects or materials to be tested are treated with a fluid, that is gaseous or liquid, solvent for the DEO-substance and then passing the solvent and any DEO-substance which has been dissolved therein through silica gel which has been impregnated with a chloride of one of the noble metals or mercury or copper. The DEO-substance is retained by the metal chloride with the formation of an adduct. Of course, if the material to be tested is a fluid solvent for the DEO-substance, it is not necessary first to dissolve the DEO out of such fluid material unless such fluid material is not inert with respect to the metal chloride.

The process according to the invention can be carried out in a number of different ways without departing from the spirit of the invention. For example, the material to be tested is first treated with a fluid solvent to dissolve out any DEO-substance contained therein and the solvent is then passed through the silica gel impregnated with a metal chloride of the character described. Naturally, the solvent employed is one which is inert both with respect to the DEO-substance and the metal chloride. The process according to the invention can be carried out very simply with known gas testing apparatus, in which the impregnated gel is disposed within the so-called gas-testing tube, through which the air or other gas is drawn or pressed with the aid of a pump which, preferably, also serves to measure the quantity of air or gas passed through the silica gel. The process can easily be employed to test for the presence of DEO-substance in all possible locations, for example, in earth or parts of plants, by drawing air past the material to be investigated and then passing such air through the impregnated silica gel carried in the gas testing tube. Conveniently, the materials to be investigated can be disposed in a container connected to the gas testing tube.

The adduct of DEO-substance and metal chloride which is formed on the silica gel can, according to the invention, also be treated with a chromatographic developer to render it visible. Materials which are of strong heteropolar character are suitable as chromatographic developers, as they react with the adduct to form intensely colored compounds. The process therefore also permits a semi-quantitative determination of the DEO-substance contained in the material to be tested, as the quantity of such substance retained on the silica gel is, to a certain extent, indicated by the depth and extent of the coloration produced on the silica gel. Suitable chromatographic developers, for example, are p-amino benzoic acid and compounds of the aryl-anti-diazotate series.

The identifying reaction is for practical purposes specific for DEO-substance and is extraordinarily sensitive. Quantities of DEO-substance as low as 0.5 μg. can be detected without trouble so that, for example, in a testing air quantity of 2 liters, a concentration of 0.25 μg. per liter can be detected.

The chromatographic developer can be disposed in dry form next to the silica gel in order to be able to obtain an unobjectionable testing reaction when such developer is not stable in solutions. For this purpose, the developer can be fixed upon an absorbent material, such as, paper or other solid material to which it adheres. Advantageously a solvent for the developer can be disposed within a shatterable ampoule along side the dry developer and the impregnated silica gel in the gas-testing tube. The open ends of the gas-testing tube can be fused together to hermetically seal such tube so that it can be stored for long periods of time without fear of deterioration. For the test the sealed ends can be opened so as to permit air or other fluid employed as a carrier for the DEO-substance to be drawn therethrough and thereafter the ampoule containing the solvent for the developer is shattered whereupon the released solvent then dissolves the developer and impregnates the silica gel therewith.

The following example will serve to illustrate the manner in which the process according to the invention can be carried out.

Example

Pure silica gel was impregnated with a 2% aqueous solution of gold chloride so that it took up 1% of its weight in gold chloride. The thus impregnated gel was then activated by drying at 100° C. and disposed within transparent glass or plastic gas-testing tubes of known configuration. Several small discs of dry filter paper which had previously been impregnated with a solution of the potassium salt of phenyl antidiazotate were placed next to the silica gel. A glass ampoule containing distilled water was disposed above these antidiazotate containing paper discs. The gas-testing tubes thus filled were then sealed.

The detection of DEO-substance in materials suspected of containing the same can, for example, be carried out by drawing air past or through such materials and then through a gas-testing tube, as prepared above, after removing the seals. Thereafter the ampoule is shattered with a mandrel so that the distilled water first wets the filter paper discs carrying the developer and dissolves the latter and then reaches the silica gel. If the test was positive for DEO-substance, this can be recognized by a deep red coloration of the upper zone of gel. This red coloration is easily ascertainable upon the yellow background of excess impregnated silica gel. Conclusions as to the concentrations of DEO-substance in the materials tested can easily be made from the intensity and extent of the red coloration as well as the quantity of air passed through the gas-testing tube.

The following procedure can, for example, be employed when testing earth samples for the presence of DEO-substance. A weighed quantity of an earth sample is placed in a column which is warmed. A constant air stream of, for example, 1 liter per minute is passed through or over the earth sample. At certain intervals of time the air is passed through a gas-testing tube, and the concentration of DEO-substance estimated each time. In this way one obtains a picture of the decrease in concentration in the air passed over or through the sample tested over the period of the test and can, upon the basis of the curve obtained and integrating, calculate the total quantity of DEO-substance contained in the sample.

Instead of employing air to convey the DEO-substance from the samples to be tested, any DEO-substance may be dissolved out of the samples with a liquid solvent and the resulting solution introduced into the gas-testing tube containing the impregnated silica gel. For example, earth samples can be tested by shaking each with hexane, filtering the earth from the resulting solutions and adjusting the solutions to a predetermined volume by addition of hexane. An equal quantity of each of such solutions, for example, a cubic centimeter, is then introduced in the gas-testing tubes. After the hexane has evaporated, the gel is treated with a solution of a developer as described above to develop the coloration which is typical of a positive test for DEO-substance.

The developer can also be disposed in the testing tube in other manners than with the aid of impregnated filter paper. It can, for example, be dusted on inert carriers such as glass beads. In view of the electrostatic forces the dusted on particles of the developer adhere extraordinarily tightly so that they are not easily shaken off mechanically.

The accompanying drawing shows a gas-testing tube in accordance with the invention. The gas-testing tube comprises a glass tube 1 having its ends fused to hermetically seal the contents thereof. Within the tube silica gel 2 which has been impregnated with gold chloride is supported on a screen 3. Several discs 4 of filter paper impregnated with the potassium salt of phenyl antidiazotate are disposed above the impregnated silica gel and a glass ampoule 5 containing distilled water is disposed above the filter paper discs. The glass ampoule is held in place by screen 6. Of course, before use for testing purposes, the sealed ends of the glass tube are removed to permit the fluid to be tested to be passed through the impregnated silica gel where any DEO-substance contained in such fluid will form an adduct with the gold chloride and be fixed on the silica gel. In order to render such adduct visible, it is merely necessary to break the ampoule so as to permit the water contained therein to pass through the impregnated filter paper discs and then reach the adduct fixed upon the silica gel.

I claim:

1. A process for detecting diethylthionophosphoric acid ester of $\beta$-oxethylthioethyl ether which comprises treating the material to be tested with fluid which is a solvent for said diethylthionophosphoric acid ester of $\beta$-oxethylthioethyl ether, then passing said solvent together with any diethylthionophosphoric acid ester of $\beta$-oxethylthioethyl ether taken up thereby through silica gel impregnated with a chloride of a metal selected from the group consisting of the noble metals, mercury and copper and treating the silica gel after the solvent has been passed therethrough with a strongly heteropolar substance, as a chromatographic developer.

2. A process according to claim 1, in which said chromatographic developer is p-amino benzoic acid.

3. A process according to claim 1, in which said chromatographic developer is an aryl antidiazotate.

4. A tube for detecting diethylthionophosphoric acid ester of $\beta$-oxethylthioethyl ether which comprises a tube carrying silica gel impregnated with a chloride of a metal selected from the group consisting of the noble metals, mercury and copper, and a strongly heteropolar substance in dry form disposed along side the silica gel within the tube.

5. A tube according to claim 4, in which said dry strongly heteropolar substance is carried upon a solid material.

6. A tube according to claim 4, in which a shatterable ampoule containing a solvent for said heteropolar substance is also carried in said tube.

References Cited in the file of this patent

UNITED STATES PATENTS

| | | |
|---|---|---|
| 2,365,938 | Cook | Dec. 26, 1944 |
| 2,476,037 | Giammaria | July 12, 1949 |

OTHER REFERENCES

Kosalapoff, "Organo-Phosphorous Compounds," pages 203, 234, 259; John Wiley and Sons.